United States Patent [19]

Martinez

[11] Patent Number: 4,558,870
[45] Date of Patent: Dec. 17, 1985

[54] MECHANICAL SEAL ASSEMBLY
[75] Inventor: Angel C. Martinez, La Habra, Calif.
[73] Assignee: Borg-Warner Corporation, Chicago, Ill.
[21] Appl. No.: 147,680
[22] Filed: May 7, 1980

Related U.S. Application Data

[63] Continuation of Ser. No. 855,517, Nov. 28, 1977, abandoned.

[51] Int. Cl.⁴ .............................................. F16J 15/34
[52] U.S. Cl. ....................................... 277/15; 277/65
[58] Field of Search ......................... 277/22, 3, 15, 74

[56] References Cited

U.S. PATENT DOCUMENTS

| | | | |
|---|---|---|---|
| 2,981,391 | 4/1961 | Schultz | 277/DIG. 8 |
| 3,511,510 | 5/1970 | Lindeboom | 277/74 |
| 3,895,811 | 7/1975 | Richard et al. | 277/65 |
| 3,968,969 | 7/1976 | Mayer et al. | 277/16 |
| 4,101,139 | 7/1978 | Nordin | 277/65 |
| 4,299,398 | 11/1981 | Wahl | 277/65 |

Primary Examiner—Robert I. Smith
Attorney, Agent, or Firm—John W. Harbst

[57] ABSTRACT

A balanced mechanical seal between two zones having different fluids, at least one of which may be corrosive, abrasive, of different lubricity, of elevated temperature and with other undesirable properties or characteristics. A buffer fluid is introduced into one zone at a constant rate so as to flow to a location radially inwardly of contacting seal faces and then radially outwardly of said seal faces. The flow serves to cool and lubricate the seal faces and substantially prevent the flow of fluid from the other of the zones radially inwardly across the seal faces. The ratio of areas which determines the seal balance is such that in the direction of buffer fluid flow it is of relatively low value. However, in the opposite direction of fluid flow, the balance is a much higher value. Thus in the event of buffer fluid failure, flow of the undesirable fluid across the seal faces is substantially prevented, thus preserving the faces from substantial damage from that undesirable fluid.

2 Claims, 1 Drawing Figure

U.S. Patent      Dec. 17, 1985      4,558,870
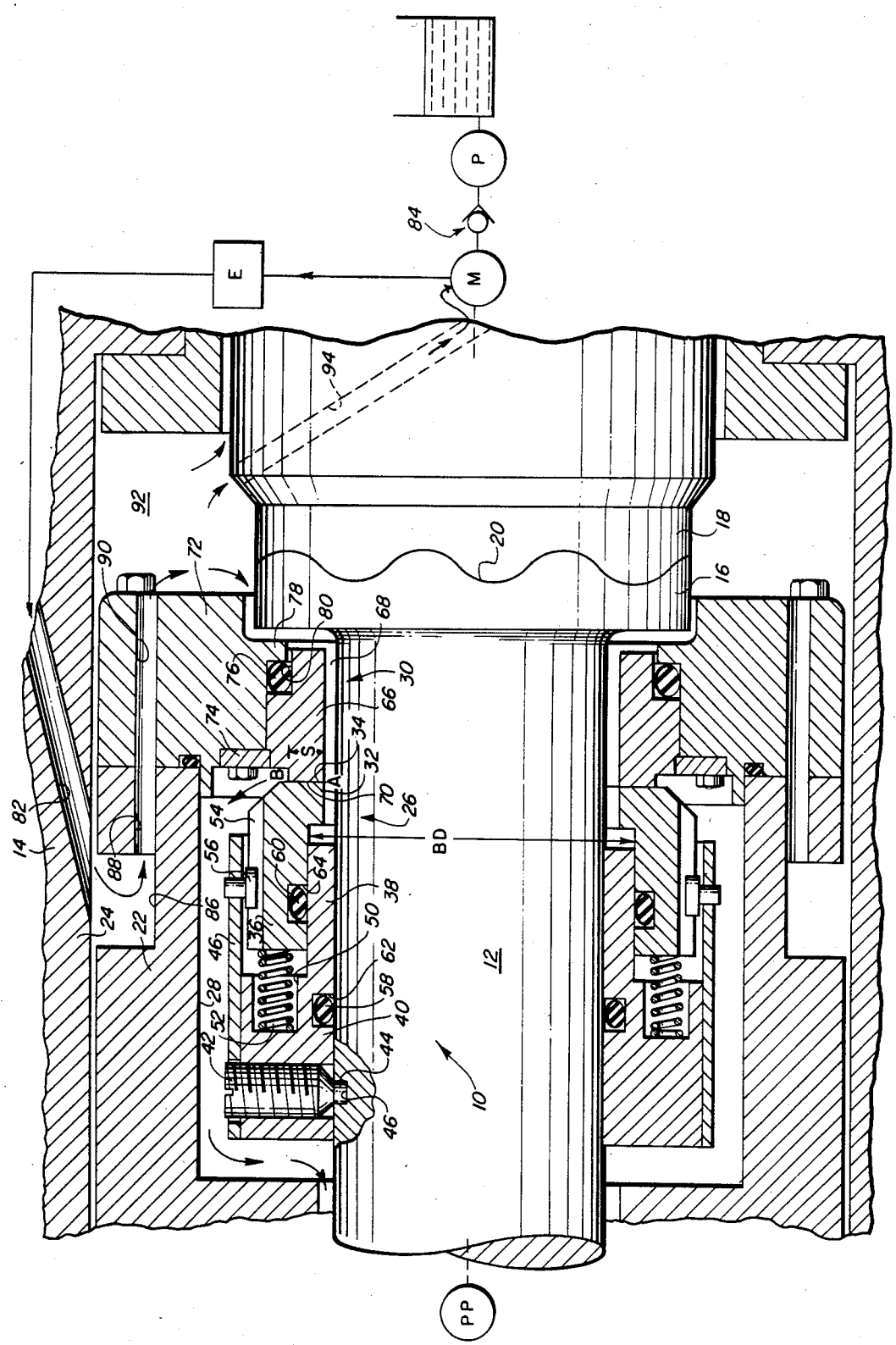

MECHANICAL SEAL ASSEMBLY

This is a continuation of application Ser. No. 855,517 filed Nov. 28, 1977 and now abandoned.

BACKGROUND OF THE INVENTION

In known high pressure, high temperature systems where a pump is operating with a fluid which has undesirable characteristics especially to motors, mechanical seal assemblies are employed to separate two fluid zones. A buffer fluid, generally the same fluid as used in the motor environment having a pressure above product pressure and a temperature generally less than product temperature is supplied from a constant flow source to the O.D. of the seal. The supply of the buffer fluid being substantially constant, a by-pass means is generally provided in parallel with the seal. The constant flow source is employed because with a product pressure, as on the order of 3000 p.s.i., pressure control is difficult, expensive and a source of unreliability.

Upon failure of the buffer fluid source, the seal is pressurized at the I.D., potentially at full product pressure, such that the abutting seal faces of the seal are subjected to tensile stresses which could lead to fracture of the seal rings. This leads to failure of the seal and the flow of product with its undesirable characteristics to the motor.

THE INVENTION

This invention relates to a mechanical seal especially for use with a shaft connecting a product pump and its driving motor and for separating two zones with different fluids. Motors used for driving such pumps are immersed in a fluid, such as an oil which can be circulated to maintain the motor at a substantially uniform temperature, generally below that of the product. The product may be caustic, abrasive, of certain lubricity or have other undesirable properties or characteristics which could seriously affect the operation and even destroy the motor if permitted to flow to the motor.

The mechanical seal of the invention is constructed with the usual contacting seal faces; however, the balance (a ratio of areas) of the seal in an axially outward direction, i.e., from the I.D. to the O.D., is materially different and lower than in a reverse direction, i.e., O.D. to the I.D. A buffer fluid—generally the same fluid as the motor fluid—is supplied or injected at a constant rate, as in the order of one gpm or less, and at a temperature generally less than that of the product, to a zone adjacent the I.D. of the seal. The injection pressure is not a controlled pressure; it is the sum of the vessel pressure plus the pressure differential across the seal. The latter is determined by the seal design involving such features as seal balance, configuration to control pressure deflection, spring loading, materials of construction and others. Some of the buffer fluid flows across the seal faces from the I.D. to the O.D. and toward the product pump; the remainder is recirculated in the system. In the event of failure of the buffer fluid supply, the probability of a concentration of product fluid at the O.D. of the seal is remote because of the constant supply of buffer fluid beforehand. The seal will then act as a normal seal with some flow across the seal faces from the O.D. to the I.D. However, the seal balance in this direction is different from that in the I.D. to O.D. direction, such that flow across the faces is much less than in the opposite direction. With these factors, product fluid may not flow to the motor, giving time for repair without harm to the motor. This, also, is effectively controlled by constructing the seal balance from the O.D. to the I.D. at a different value from that in the opposite direction.

THE DRAWING

The single FIGURE of the drawing is a partial sectional view of a mechanical seal assembly according to this invention.

DETAILED DESCRIPTION

The single FIGURE of the drawing illustrates a mechanical seal assembly, generally identified as 10, which is associated with a shaft 12 and a housing 14. The shaft 12 is illustrated as constructed in two parts 16, 18, joined by a curvic connector 20. The shaft 16 is connected to a driven product pump PP. The shaft 18 is connected to a motor M. The housing 14 may be in multiple parts, such as the housing part 22 surrounded by a jacket 24.

The mechanical seal assembly 10 comprises a rotating seal assembly 26 in a cavity 28 in the housing 22, and a non-rotating or stationary seal assembly 30. The rotating seal assembly 26 comprises a generally cylindrical sealing ring 32 spaced from the shaft 16 and having a seal face 34 and with a rearwardly extending cylindrical portion 36 surrounding a cylindrical portion 38 of a spring holder 40 of generally cylindrical shape attached by a drive screw 42 to the shaft 16. The drive screw 42 has a tang 44 received in a correspondingly shaped opening 46 in the shaft 16. A cylindrical sleeve 48 surrounds the spring holder 40, and the holder has a plurality of generally equally spaced spring pockets 50 therein, each of which receives a coil spring 52 which resiliently urges the seal ring 32 toward the right, as viewed in the drawing. The seal ring 32 is provided with an axially disposed keyway 54 to receive a drive pin 56 connected to the sleeve 48. The sleeve 48 is attached by a drive means, such as the upper end of the set screw 42 to the spring holder 40. This construction insures non-rotation of the seal ring 32 relative to the spring holder 40. Suitable O-ring seals 58 and 60 in grooves 62, 64, respectively, in the spring holder 40 and the seal ring 32, seal the spring holder 40 to the shaft 16 and the seal ring 32 to the cylindrical portion 36 of the spring holder 40.

The non-rotatable seal assembly 30 comprises a generally cylindrical seal ring 66 having an inside diameter such that it defines a cylindrical passage 68 with the shaft 16. The seal ring 66 has a seal face 70 engaging the seal face 34 of the seal ring 32. The seal ring 66 is connected to the housing 22 by means of a generally cylindrical seal flange 72 bolted to the housing 22 and a ring member 74 bolted to the seal flange 72. An O-ring seal 76 located between a flange 78 of the seal flange 72 and an annular recess 80 of the seal ring 66 seals against fluid passage along the outer periphery of the seal ring 66.

The jacket 24 is provided with at least one inlet passage 82 connected to a source of a buffer fluid such as from a pumping ring located in the motor. A positive displacement pump P pressurizes the motor. A one way valve 84 is provided between the pump P and the motor M to prevent the back flow of fluid to the pump P. The housing 22 is formed with an annular groove 86 communicating with the passage 82 and one or more axial communicating passages 88 which in turn communicate with coaxial passages 90 in the seal flange 72. The source of buffer fluid provides a constant flow of fluid at a pressure above that at the left side of the seal, i.e., the product being pumped by the product pump PP.

Buffer fluid at a constant rate, as on the order of one gpm or less, and at a temperature generally less than that at the product pump PP, is injected by the positive displacement pump P from a source through the check valve 84, into the motor and the pumping ring supplies the buffer fluid to the passage 82. The fluid flows into the annular groove 86, and through the communicating passages 88, 90 into an annular cavity 92. Some of the buffer fluid flows to the inner diameter of the seal faces 34, 70. Because of the seal balance, spring force, and other design features, a back pressure is created and some of the buffer fluid flows across the seal faces and toward the product pump PP, as indicated by the arrows. The flow of buffer fluid across the seal faces cool, lubricates and preserves the faces with a minimum of buffer fluid, and above all, substantially prevents product fluid from the product pump PP flowing to the motor M, thus preserving the motor. Also there is a cooling effect on the seal by the buffer fluid in the groove 86. Excess buffer fluid flows through a passage 94 in the shaft 18 and back to the pumping ring to be recirculated.

In the event of a pressure reversal, i.e., when the pressure of the fluid at the product pump PP is above that of the buffer fluid (due to operational difficulties of the pump P or buffer fluid supply failure), the seal becomes pressurized in a conventional fashion, i.e., from the outer diameter. Back flow of buffer fluid to the pump P is normally prevented by the valve 84.

Looking again at the drawing, the sealing surface is identified as S, one diameter of the rotating seal ring is identified as BD (also known as balance diameter) and the opposite pressure sides of the seal are identified as A and B. A large percentage of the sealing surface S is radially outwardly of the balance diameter BD and the remainder is radially inwardly of BD. Thus, if the first percentage is 75% then the seal balance ratio in a radially inwardly direction at B is 75% while the seal balance ratio in a radially outwardly direction at A is 25%. Thus, flow of buffer fluid radially outwardly from A to B easily occurs; in the event of buffer fluid failure, flow of pump fluid does not easily occur; it is substantially prevented.

The buffer fluid supply is integrated with the motor fluid supply and a heat exchanger E is located in the system as shown. The heat exchanger is usable not only to remove heat from buffer fluid which has contacted the motor but also to condition fluid to the I.D. of the seal. This is essentially a closed system with only one exit path, i.e., across the seal face from I.D. to O.D.

I claim:

1. A mechanical seal assembly for separating different fluids, one of which has undesirable properties and is supplied by a product pump driven by the shaft of a motor, which motor is immersed in another of said fluids comprising motor fluid, said seal assembly separating a first zone containing said fluid having said undesirable properties and a second zone containing said motor fluid, said seal assembly being located in a housing, and comprising:

a first seal ring connected to and rotatable with said shaft;

a second seal ring connected to said housing;

opposed radial seal faces on said seal rings;

resilient means urging said seal rings and the faces thereon toward one another;

a motor fluid supply means; and means including a pump for pumping motor fluid from said supply means to said motor and from said motor to said second zone, located radially inwardly of said seal faces, and at a pressure above the pressure of said one fluid with undesirable properties in said first zone, so as to flow radially outwardly across said seal faces to cool and lubricate said seal faces and prevent the flow of said one fluid with undesirable properties across said seal faces in a radially inwardly direction toward and into said second zone.

2. A mechanical seal assembly as recited in claim 1 in which said assembly is so constructed and arranged to have a seal balance a radially outwardly direction which is less than the seal balance in a radially inwardly direction whereby the differential in seal balance substantially prevents the flow of fluid with undesirable properties in a radially inwardly direction upon failure of said motor fluid supply.

* * * * *